(12) United States Patent
Takimoto et al.

(10) Patent No.: US 7,383,111 B2
(45) Date of Patent: Jun. 3, 2008

(54) STEERING APPARATUS

(75) Inventors: Shigenori Takimoto, Utsunomiya (JP);
Osamu Tsurumiya, Kawachi-gun (JP);
Yasushi Shoda, Utsunomiya (JP);
Masato Yuda, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 8 days.

(21) Appl. No.: 11/230,371

(22) Filed: Sep. 20, 2005

(65) Prior Publication Data

US 2006/0064214 A1 Mar. 23, 2006

(30) Foreign Application Priority Data

Sep. 22, 2004 (JP) ............................. 2004-274986

(51) Int. Cl.
*B62D 6/00* (2006.01)
*G06F 17/00* (2006.01)

(52) U.S. Cl. .............................. 701/41; 701/1; 701/42; 701/43; 701/70; 180/421; 180/422; 180/443; 180/446

(58) Field of Classification Search .................. 701/41, 701/70, 42, 43; 280/5.51; 342/70; 180/433, 180/446, 421, 422, 443
See application file for complete search history.

(56) References Cited

U.S. PATENT DOCUMENTS

| | | | | |
|---|---|---|---|---|
| 5,446,657 A | * | 8/1995 | Ikeda et al. ................... 701/41 |
| 5,528,497 A | * | 6/1996 | Yamamoto et al. ............ 701/41 |
| 5,642,281 A | * | 6/1997 | Ishida et al. ................... 701/41 |
| 5,703,775 A | * | 12/1997 | Yamamoto et al. ............ 701/41 |
| 5,774,819 A | | 6/1998 | Yamamoto et al. |
| 5,828,972 A | | 10/1998 | Asanuma et al. |
| 5,915,800 A | * | 6/1999 | Hiwatashi et al. .......... 303/146 |
| 5,927,430 A | * | 7/1999 | Mukai et al. ................ 180/446 |
| 5,948,027 A | * | 9/1999 | Oliver et al. .................. 701/37 |
| 5,991,675 A | * | 11/1999 | Asanuma ...................... 701/41 |
| 6,085,860 A | | 7/2000 | Hackl et al. |
| 6,101,434 A | * | 8/2000 | Irie et al. ...................... 701/36 |

(Continued)

FOREIGN PATENT DOCUMENTS

DE 42 32 256 C2 4/1993

(Continued)

*Primary Examiner*—Jack Keith
*Assistant Examiner*—Chuong Nguyen
(74) *Attorney, Agent, or Firm*—Carrier, Blackman & Associates, P.C.; Joseph P. Carrier; William D. Blackman

(57) ABSTRACT

A steering apparatus for a vehicle includes a steering angle measuring unit, a vehicle speed measuring unit, a yaw rate measuring unit, a yaw rate-based reaction force control unit for controlling a steering reaction force depending on an actual yaw rate measured by the yaw rate measuring unit, and a yaw rate deviation-based reaction force control unit for determining a standard yaw rate depending on at least the steering angle and the vehicle speed, calculating a yaw rate deviation between the standard yaw rate and the actual yaw rate, and controlling the steering reaction force depending on the yaw rate deviation, and a primary control unit for executing a control operation such that a degree of contribution of the yaw rate-based reaction force control unit is decreased and a degree of contribution of the yaw rate deviation-based reaction force control unit is increased as the yaw rate deviation increases.

5 Claims, 2 Drawing Sheets

U.S. PATENT DOCUMENTS

| | | | |
|---|---|---|---|
| 6,108,599 A * | 8/2000 | Yamamoto et al. | 701/41 |
| 6,144,908 A * | 11/2000 | Yasuda | 701/41 |
| 6,363,309 B1 * | 3/2002 | Irie et al. | 701/70 |
| 6,374,162 B1 * | 4/2002 | Tanaka et al. | 701/1 |
| 6,449,543 B2 * | 9/2002 | Nishizaki et al. | 701/41 |
| 6,615,124 B1 * | 9/2003 | Adachi | 701/70 |
| 6,961,649 B2 * | 11/2005 | Kato et al. | 701/70 |

FOREIGN PATENT DOCUMENTS

| | | |
|---|---|---|
| DE | 195 27 334 A1 | 2/1996 |
| DE | 197 51 227 A1 | 9/1998 |
| JP | 06-092253 | 4/1994 |
| JP | 06-344935 | 12/1994 |

* cited by examiner

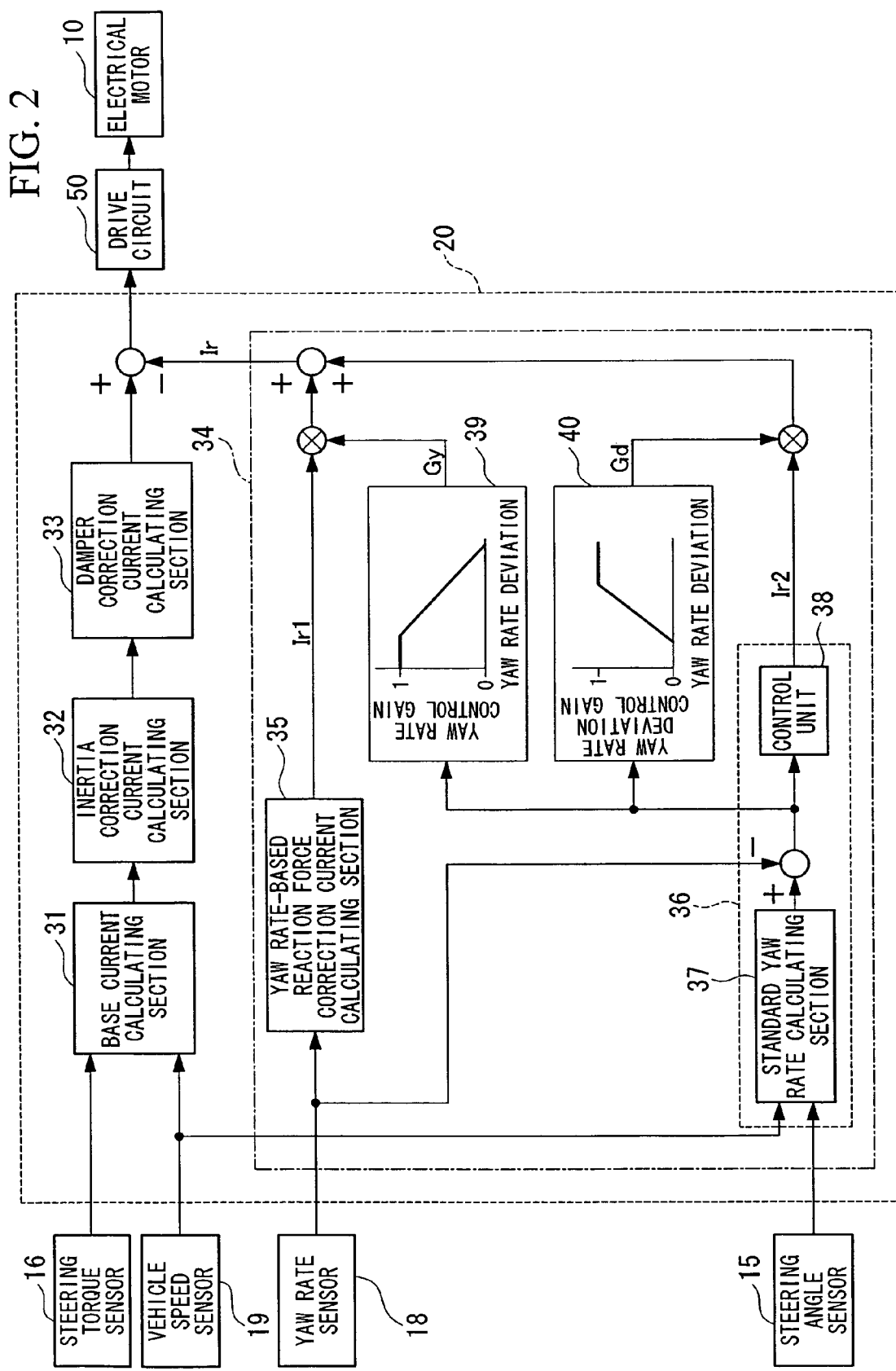

STEERING APPARATUS

BACKGROUND OF THE INVENTION

1. Field of the Invention

The present invention relates to a steering apparatus for a movable body such as a vehicle, and in particular, relates to a steering apparatus including a reaction force control device.

Priority is claimed on Japanese Patent Application No. 2004-274986, filed Sep. 22, 2004, the content of which is incorporated herein by reference.

2. Description of the Related Art

An electrical power steering apparatus is known as a steering apparatus for a vehicle. In an electrical power steering apparatus, a steering shaft connected to a steering wheel and a turning mechanism for turning steerable wheels are mechanically connected, and an electrical motor for assisting steering force is associated with the turning mechanism. In general, a driving torque command (drive current) for the electrical motor is controlled so that an assisting steering force is increased as the steering operation torque applied to the steering shaft increases.

Moreover, as such an electrical power steering apparatus, a steering system is known in which, in order to restrain irregular movement of the vehicle due to disturbance (e.g., crosswind), a vehicle movement (e.g., a yaw rate) is measured by a measuring means, a drive torque correction value for compensating for the vehicle movement is calculated, a drive torque command is calculated by subtracting the drive torque correction value from a drive torque base command that is set depending on the steering operation torque, and the electrical motor is controlled according to the drive torque command (see, for example, Published Japanese Patent No. 3229074).

In general in a related art, when a yaw rate is used to represent a vehicle movement, a control operation is performed so that the drive torque correction value is increased as the yaw rate increases. In other words, the driving torque of the electrical motor is controlled so that the assisting steering force by the electrical motor is decreased as the yaw rate increases. Accordingly, the drive torque correction value may be referred to as a reaction force with respect to the assisting steering force.

In the steering system constructed as explained above, even during, for example, a normal turning state in which a yaw rate appears, the drive torque correction value is generated so as to reduce the yaw rate, i.e., so as to control the vehicle toward a straightforward state, and thus the assisting steering force is reduced.

Accordingly, when the reaction force is controlled depending on the yaw rate, a steering stability is improved, and steering operation feel is also improved.

Moreover, as another control system to restrain irregular movement of the vehicle due to disturbance (e.g., crosswind), another steering system is also known in which a standard yaw rate is determined based on a steering angle and vehicle speed, an actual yaw rate is measured by a yaw rate sensor, a drive torque correction value is calculated which is required to make a deviation (hereinafter referred to as a yaw rate deviation) between the standard yaw rate and the actual yaw rate to be zero, a drive torque command is calculated by subtracting the drive torque correction value from a drive torque base command that is set depending on the steering operation torque, and the electrical motor is controlled according to the drive torque command (see, for example, Published Japanese Patent No. 3110892). As in the aforementioned case, because the assisting steering force is decreased as the drive torque correction value that is calculated based on the yaw rate deviation increases, the drive torque correction value may be referred to as a reaction force with respect to the assisting steering force.

By such a reaction force control operation depending on the yaw rate deviation, because the degree of understeer can be restrained and oversteer can be prevented, the vehicle stability can be improved.

However, when the reaction force is controlled depending on the yaw rate, although a steering operation feel may be improved, the vehicle stability (i.e., restraint of the degree of understeer and prevention of oversteer) cannot be sufficiently improved if the yaw rate is unexpectedly large or small (i.e., the yaw rate deviation is large).

On the other hand, when the reaction force is controlled depending on the yaw rate deviation, although the vehicle stability under a large yaw rate deviation can be improved, the steering operation feel may be degraded if such a control operation is carried out under a small yaw rate deviation.

SUMMARY OF THE INVENTION

In view of the above circumstances, an object of the present invention is to provide a steering apparatus by which improvements of the steering operation feel and the vehicle stability can be simultaneously achieved.

In order to achieve the above object, the present invention provides a steering apparatus for a vehicle, including: a steering angle measuring unit for measuring a steering angle; a vehicle speed measuring unit for measuring a vehicle speed; a yaw rate measuring unit for measuring an actual yaw rate of the vehicle; a yaw rate-based reaction force control unit for controlling a steering reaction force depending on the actual yaw rate measured by the yaw rate measuring unit; and a yaw rate deviation-based reaction force control unit for determining a standard yaw rate depending on at least the steering angle and the vehicle speed, calculating a yaw rate deviation between the standard yaw rate and the actual yaw rate, and controlling the steering reaction force depending on the yaw rate deviation; and a primary control unit for executing a control operation such that a degree of contribution of the yaw rate-based reaction force control unit is decreased and a degree of contribution of the yaw rate deviation-based reaction force control unit is increased as the yaw rate deviation increases According to the construction described above, regardless of the magnitude of the yaw rate, the reaction force is mainly controlled by the yaw rate-based reaction force control unit when the yaw rate deviation between the standard yaw rate and the actual yaw rate is relatively small, and the reaction force is mainly controlled by the yaw rate deviation-based reaction force control unit when the yaw rate deviation is relatively large.

In the above steering apparatus, the degree of contribution of the yaw rate-based reaction force control unit may be changed by changing a yaw rate control gain, by which at least a portion of the steering reaction force is determined, depending on the yaw rate deviation, and the degree of contribution of the yaw rate deviation-based reaction force control unit may be changed by changing a yaw rate deviation control gain, by which at least a portion of the steering reaction force is determined, depending on the yaw rate deviation.

According to the present invention, because the reaction force is mainly controlled by the yaw rate-based reaction force control unit when the yaw rate deviation is relatively small, the steering stability becomes superior, and the steering operation feel can be improved. On the other hand, because the reaction force is mainly controlled by the yaw rate deviation-based reaction force control unit when the yaw rate deviation is relatively large, the degree of understeer can be restrained and oversteer can be prevented, and thus the vehicle stability can be improved.

BRIEF DESCRIPTION OF THE DRAWINGS

FIG. 2 is a block diagram showing a current control configuration for an electrical motor of the electrical power steering apparatus.

DESCRIPTION OF THE PREFERRED EMBODIMENTS

Figure 1:
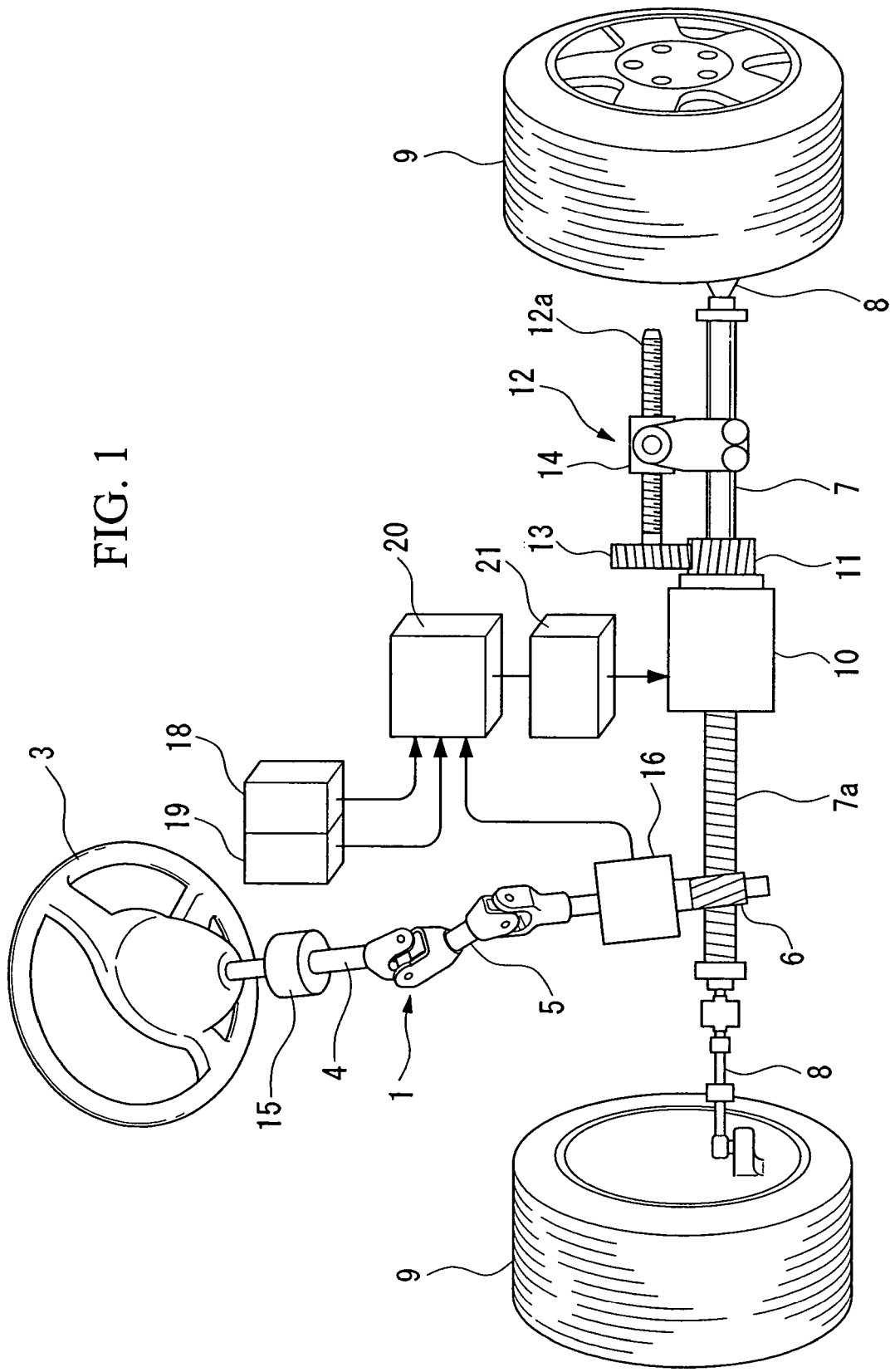
FIG. 1 is a structural diagram of an electrical power steering apparatus as an embodiment of a steering apparatus according to the present invention.

An embodiment of a steering apparatus of the present invention will be explained below with reference to FIGS. 1 and 2. In the following embodiment, an aspect of the present invention, which is employed in an electrical power steering apparatus, is explained.

First, the construction of the electrical power steering apparatus will be explained below with reference to FIG. 1. The electrical power steering apparatus includes a manual steering force generating mechanism 1. The manual steering force generating mechanism 1 includes a steering wheel 3 (operation unit), a steering shaft 4 that is integrally connected to the steering wheel 3 and is connected to a pinion 6 of a rack and pinion mechanism via a connecting shaft 5 having a universal joint. The pinion 6 engages a rack 7a of a rack shaft 7 that is allowed to reciprocate in a widthwise direction of the vehicle. Front wheels 9 as steerable wheels are respectively connected to the ends of the rack shaft 7 via tie rods 8. By this construction, when the steering wheel 3 is operated, a normal rack and pinion type steering operation is possible, thereby the front wheels are steered, and the vehicle can be turned. The rack shaft 7 and the tie rods 8 constitute a steering mechanism.

Moreover, on the axis of the rack shaft 7, there is provided an electrical motor 10 for applying assisting steering force to assist the steering force generated by the manual steering force generating mechanism 1. The assisting steering force supplied by the electrical motor 10 is converted into thrust via a ball screw mechanism 12 that is provided in a substantially parallel manner with the rack shaft 7, and is applied to the rack shaft 7. To achieve this, a driving helical gear 11 is integrated with the rotor of the electrical motor 10, a driven helical gear 13 engaging with the driving helical gear 11 is provided at an end of the screw shaft 12a of the ball screw mechanism 12, and a nut 14 of the ball screw mechanism 12 is fixed to the rack shaft 7.

A steering angle sensor 15 (a steering angle measuring unit) for measuring steering angle of the steering shaft 4 is provided on the steering shaft 4, and a steering operation torque sensor 16 (a steering operation torque measuring unit) for measuring steering operation torque applied to the pinion 6 is provided in a steering gear box (not shown) that houses the rack and pinion mechanism (6 and 7a). The steering angle sensor 15 sends electrical signals corresponding to the measured steering angle to a steering control unit 20 (ECU (a primary control unit)), and the steering operation torque sensor 16 sends electrical signals corresponding to the measured steering operation torque to the steering control unit 20.

In addition, a yaw rate sensor 18 (a yaw rate measuring unit) for measuring yaw rate (vehicle movement) of the vehicle and a vehicle speed sensor 19 for measuring vehicle speed are mounted on appropriate places of the vehicle body. The yaw rate sensor 18 sends electrical signals corresponding to the measured yaw rate to the ECU 20, and the vehicle speed sensor 19 sends electrical signals corresponding to the measured vehicle speed to the ECU 20.

The ECU 20 determines target electrical current to be supplied to the electrical motor 10 based on control signals obtained by processing input signals from the sensors 15, 16, 18, and 19, and controls output torque of the electrical motor 10 by supplying the target electrical current to the electrical motor 10 via a drive circuit 21 so as to control the assisting steering force during a steering operation.

Next, an electrical current control operation applied to the electrical motor 10 in this embodiment will be explained below with reference to the control block diagram shown in FIG. 2.

The ECU 20 includes a base current calculating section 31, an inertia correction current calculating section 32, a damper correction current calculating section 33, and a reaction force correction current calculating section 34.

The base current calculating section 31 determines base current that depends on the steering operation torque and vehicle speed based on the output signals from the steering operation torque sensor 16 and the vehicle speed sensor 19 and by referring to a base current table (not shown). In the base current table, the base current is set so as to increase as the steering operation torque increases, and is set so as to decrease as the vehicle speed increases.

The inertia correction current calculating section 32 determines inertia correction current, which depends on a timewise differential value of the steering operation torque and the vehicle speed, based on a differential value (i.e., the timewise differential value of the steering operation torque) that is obtained by applying a timewise differentiation to the output signal from the steering operation torque sensor 16 and on the vehicle speed measured by the vehicle speed sensor 19 and by further referring to an inertia correction current table (not shown). The inertia correction current is electrical current to be supplied to the electrical motor 10 to compensate for inertia moment due to the electrical motor 10 and the steering system.

The damper correction current calculating section 33 calculates damper correction current, which depends on a steering angular velocity and the vehicle speed, based on a differential value (i.e., the steering angular velocity) that is obtained by applying a timewise differentiation to the output signal from the steering angle sensor 15 and on the vehicle speed measured by the vehicle speed sensor 19 and by further referring to a damper correction current table (not shown). In the damper correction current table of this embodiment, the damper correction current is set so as to increase as the steering angular velocity increases.

The reaction force correction current calculating section 34 calculates reaction force correction current Ir based on the yaw rate and the yaw rate deviation. The reaction force correction current calculating section 34 will be separately explained below in more detail.

The ECU 20 calculates a target current by adding the inertia correction current calculated by the inertia correction current calculating section 32 to the base current calculated by the base current calculating section 31, subtracting therefrom the damper correction current calculated by the damper correction current calculating section 33, and further subtracting therefrom the reaction force correction current Ir calculated by the reaction force correction current calculating section 34. The target current is input to a drive circuit 50, the drive circuit 50 executes a control operation such that electrical current flowing through the electrical motor 10 coincides with the target current, so that the output torque of the electrical motor 10 is controlled, and thus the assisting steering force is controlled.

Accordingly, in the electrical power steering apparatus of this embodiment, the reaction force correction current Ir set by the reaction force correction current calculating section 34 may be referred to as a reaction force (i.e., a steering reaction force) with respect to the assisting steering force.

Next, the reaction force correction current calculating section 34 will be explained below in detail. The reaction force correction current calculating section 34 includes a yaw rate-based reaction force correction current calculation section 35 (a yaw rate-based reaction force control unit) and a yaw rate deviation-based reaction force correction current calculation section 36 (a yaw rate deviation-based reaction force control unit).

The yaw rate-based reaction force correction current calculation section 35 calculates yaw rate-based reaction force correction current Ir1 based on the output signal from the yaw rate sensor 18 and by referring to a yaw rate-based reaction force correction current table (not shown). In the yaw rate-based reaction force correction current table, the yaw rate-based reaction force correction current Ir1 is set so as to increase (in other words, so that the steering reaction force is increased) as the yaw rate increases.

In the yaw rate deviation-based reaction force correction current calculation section 36, first, a standard yaw rate calculating section 37 calculates a standard yaw rate that depends on the vehicle speed and steering angle based on the output signals from the vehicle speed sensor 19 and the steering angle sensor 15 and by referring to a standard yaw rate table (not shown), and outputs the standard yaw rate as a standard yaw rate signal. Because the yaw rate of the vehicle can be estimated based on at least the vehicle speed and steering angle, the yaw rate depending on the vehicle speed and steering angle can be set in advance based on experiments or simulations. Such a yaw rate that is set in this manner is, in this specification, defined as a standard yaw rate. The standard yaw rate table is a table in which the standard yaw rates depending on the vehicle speed and steering angle are set.

Next a difference between the output signal from the standard yaw rate calculating section 37 and output signal from the yaw rate sensor 18 is determined. In other words, a deviation (a yaw rate deviation) between the standard yaw rate calculated by the standard yaw rate calculating section 37 and the actual yaw rate measured by the yaw rate sensor 18 is calculated.

The yaw rate deviation-based reaction force correction current calculation section 36 calculates yaw rate deviation-based reaction force correction current Ir2 so that the yaw rate deviation in a control unit 38 (e.g., a PID control unit) becomes zero.

The reaction force correction current calculating section 34 basically outputs, as the reaction force correction current Ir, sum (Ir1+Ir2) of the yaw rate-based reaction force correction current Ir1 calculated by the yaw rate-based reaction force correction current calculation section 35 and yaw rate deviation-based reaction force correction current Ir2 calculated by the yaw rate deviation-based reaction force correction current calculation section 36; however, in this steering apparatus, the degree of contribution of the yaw rate-based reaction force correction current calculation section 35 and the degree of contribution of the yaw rate deviation-based reaction force correction current calculation section 36 are changed depending on the magnitude of the yaw rate deviation.

More specifically, the reaction force correction current calculating section 34 calculates a yaw rate control gain Gy that depends on the yaw rate deviation by referring to a yaw rate control gain table 39, and further calculates a yaw rate deviation control gain Gd that depends on the yaw rate deviation by referring to a yaw rate deviation control gain table 40.

In the yaw rate control gain table 39, the yaw rate control gain Gy is set to be constant at "1" as long as the yaw rate deviation is less than or equal to a first predetermined value, and is set so as to gradually decrease to finally "0" as the yaw rate deviation increases beyond the first predetermined value.

On the other hand, in the yaw rate deviation control gain table 40, the yaw rate deviation control gain Gd is set to be constant at "0" as long as the yaw rate deviation is less than or equal to a second predetermined value, and is set so as to gradually increase to finally "1" as the yaw rate deviation increases beyond the second predetermined value. The second predetermined value may be the same as the first predetermined value, and alternatively, the second predetermined value may be different from the first predetermined value.

As a result, when the yaw rate deviation is small, the yaw rate control gain Gy is set to a large value, and the yaw rate deviation control gain Gd is set to a small value. In contrast, as the yaw rate deviation becomes large, the yaw rate control gain Gy is set to a small value, and the yaw rate deviation control gain Gd is set to a large value, i.e., the yaw rate control gain Gy is set to be smaller than the yaw rate deviation control gain Gd.

The reaction force correction current calculating section 34 adds a product (Ir1Gy), which is obtained by multiplying the yaw rate-based reaction force correction current Ir1 output from the yaw rate-based reaction force correction current calculation section 35 and the yaw rate control gain Gy determined by the yaw rate control gain table 39, to a product (Ir2Gd), which is obtained by multiplying the yaw rate deviation-based reaction force correction current Ir2 output from the yaw rate deviation-based reaction force correction current calculation section 36 and the yaw rate deviation control gain Gd determined by the yaw rate deviation control gain table 40, and outputs the obtained sum (Ir1Gy+Ir2Gd) as the reaction force correction current Ir (i.e., Ir=Ir1Gy+Ir2Gd).

In this steering apparatus, because the reaction force correction current Ir is set in this manner, the degree of contribution of the yaw rate-based reaction force correction current calculation section 35 to the reaction force correction current Ir (i.e., to the steering reaction force) is large and the degree of contribution of the yaw rate deviation-based reaction force correction current calculation section 36 is small when the yaw rate deviation is small. Accordingly, regardless of the magnitude of the yaw rate, the reaction force correction current Ir more depends on the yaw rate-based reaction force correction current Ir1 than on the yaw rate deviation-based reaction force correction current Ir2 when the yaw rate deviation is relatively small. As a result, the steering stability becomes superior, and the steering operation feel can be improved.

Moreover, in this steering apparatus, the degree of contribution of the yaw rate-based reaction force correction current calculation section 35 to the reaction force correction current Ir becomes small and the degree of contribution of the yaw rate deviation-based reaction force correction current calculation section 36 becomes large as the yaw rate deviation increases. Accordingly, regardless of the magnitude of the yaw rate, the reaction force correction current Ir more depends on the yaw rate deviation-based reaction force correction current Ir2 than on the yaw rate-based reaction force correction current Ir1 when the yaw rate deviation is relatively large. As a result, the degree of understeer can be restrained and oversteer can be prevented, and thus the vehicle stability can be improved.

Therefore, according to this steering apparatus, improvements of the steering operation feel and the vehicle stability can be simultaneously achieved.

OTHER EMBODIMENTS

The present invention is not limited to the embodiment described above.

For example, application of the steering apparatus of the present invention is not limited to the electrical power steering apparatus in the embodiment described above, and the present invention may be applicable to a vehicle steering apparatus in a steer-by-wire system (SBW), a vehicle steering apparatus in an active steering system, and to a vehicle steering apparatus in a variable gear ratio steering system (VGS).

The steer-by-wire system is a steering system that includes an operation unit, a steering mechanism that is mechanically separated from the operation unit, a reaction force motor that applies reaction force to the operation unit, and a steering motor that is provided in the steering mechanism to turn steerable wheels.

The active steering system is a steering system in which steered angle of the front wheels and steered angle of the rear wheels are controlled depending on the steering operation by the driver and vehicle motion.

The variable gear ratio steering system is a steering system in which the steering gear ratio varies depending on magnitude of the steering angle Further additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A steering apparatus for a vehicle, comprising:
   a steering angle sensor;
   a vehicle speed sensor;
   a yaw rate sensor;
   a yaw rate-based reaction force control unit configured to control a steering reaction force depending on the actual yaw rate measured by the yaw rate measuring unit;
   a yaw rate deviation-based reaction force control unit configured to determine a standard yaw rate depending on at least the steering angle and the vehicle speed, calculate a yaw rate deviation between the standard yaw rate and the actual yaw rate, and control the steering reaction force depending on the yaw rate deviation;
   a primary control unit configured to execute a control operation such that a degree of contribution of the yaw rate-based reaction force control unit is decreased and a degree of contribution of the yaw rate deviation-based reaction force control unit is increased as the yaw rate deviation increases; and
   a mechanism which applies the steering reaction force to the steering apparatus.

2. A steering apparatus for a vehicle comprising:
   a steering angle sensor;
   a vehicle speed sensor;
   a yaw rate sensor;
   a yaw rate-based reaction force control unit configured to control a steering reaction force depending on the actual yaw rate measured by the yaw rate measuring unit;
   a yaw rate deviation-based reaction force control unit configured to determine a standard yaw rate depending on at least the steering angle and the vehicle speed, calculate a yaw rate deviation between the standard yaw rate and the actual yaw rate, and control the steering reaction force depending on the yaw rate deviation; and
   a primary control unit configured to execute a control operation such that a degree of contribution of the yaw rate-based reaction force control unit is decreased and a degree of contribution of the yaw rate deviation-based reaction force control unit is increased as the yaw rate deviation increases;
   wherein the degree of contribution of the yaw rate-based reaction force control unit is changed by changing a yaw rate control gain, by which at least a portion of the steering reaction force is determined, depending on the yaw rate deviation.

3. A steering apparatus for a vehicle comprising:
   a steering angle sensor;
   a vehicle speed sensor;
   a yaw rate sensor;
   a yaw rate-based reaction force control unit configured to control a steering reaction force depending on the actual yaw rate measured by the yaw rate measuring unit;
   a yaw rate deviation-based reaction force control unit configured to determine a standard yaw rate depending on at least the steering angle and the vehicle speed, calculate a yaw rate deviation between the standard yaw rate and the actual yaw rate, and control the steering reaction force depending on the yaw rate deviation; and
   a primary control unit configured to execute a control operation such that a degree of contribution of the yaw rate-based reaction force control unit is decreased and a degree of contribution of the yaw rate deviation-based reaction force control unit is increased as the yaw rate deviation increases;
   wherein the degree of contribution of the yaw rate deviation-based reaction force control unit is changed by changing a yaw rate deviation control gain, by which at least a portion of the steering reaction force is determined, depending on the yaw rate deviation.

4. A steering apparatus for a vehicle, according to claim 1, wherein the mechanism is a ball screw mechanism operatively connected to a rack of the steering apparatus.

5. A steering apparatus for a vehicle comprising:
   a steering angle sensor;
   a vehicle speed sensor;
   a yaw rate sensor;

a yaw rate-based reaction force control unit configured to control a steering reaction force depending on the actual yaw rate measured by the yaw rate measuring unit;

a yaw rate deviation-based reaction force control unit configured to determine a standard yaw rate depending on at least the steering angle and the vehicle speed, calculate a yaw rate deviation between the standard yaw rate and the actual yaw rate, and control the steering reaction force depending on the yaw rate deviation; and a primary control unit configured to execute a control operation such that a degree of contribution of the yaw rate-based reaction force control unit is decreased and a degree of contribution of the yaw rate deviation-based reaction force control unit is increased as the yaw rate deviation increases;

wherein the primary control unit executes the control operation such that a degree of contribution of the yaw rate-based reaction force control unit is constant when the yaw rate deviation is less than or equal to a predetermined value, and is gradually decreased to zero as the yaw rate deviation increases beyond the predetermined value.

* * * * *